Inventor
Dante Giacosa
By Robert E. Burns
Attorney

Inventor
Dante Giacosa
By Robert E Burns
Attorney

April 14, 1953 D. GIACOSA 2,634,710
PROPELLING UNIT FOR MOTOR VEHICLES
Filed Aug. 25, 1950 6 Sheets-Sheet 5

Inventor
Dante Giacosa
By Robert E. Burns
Attorney

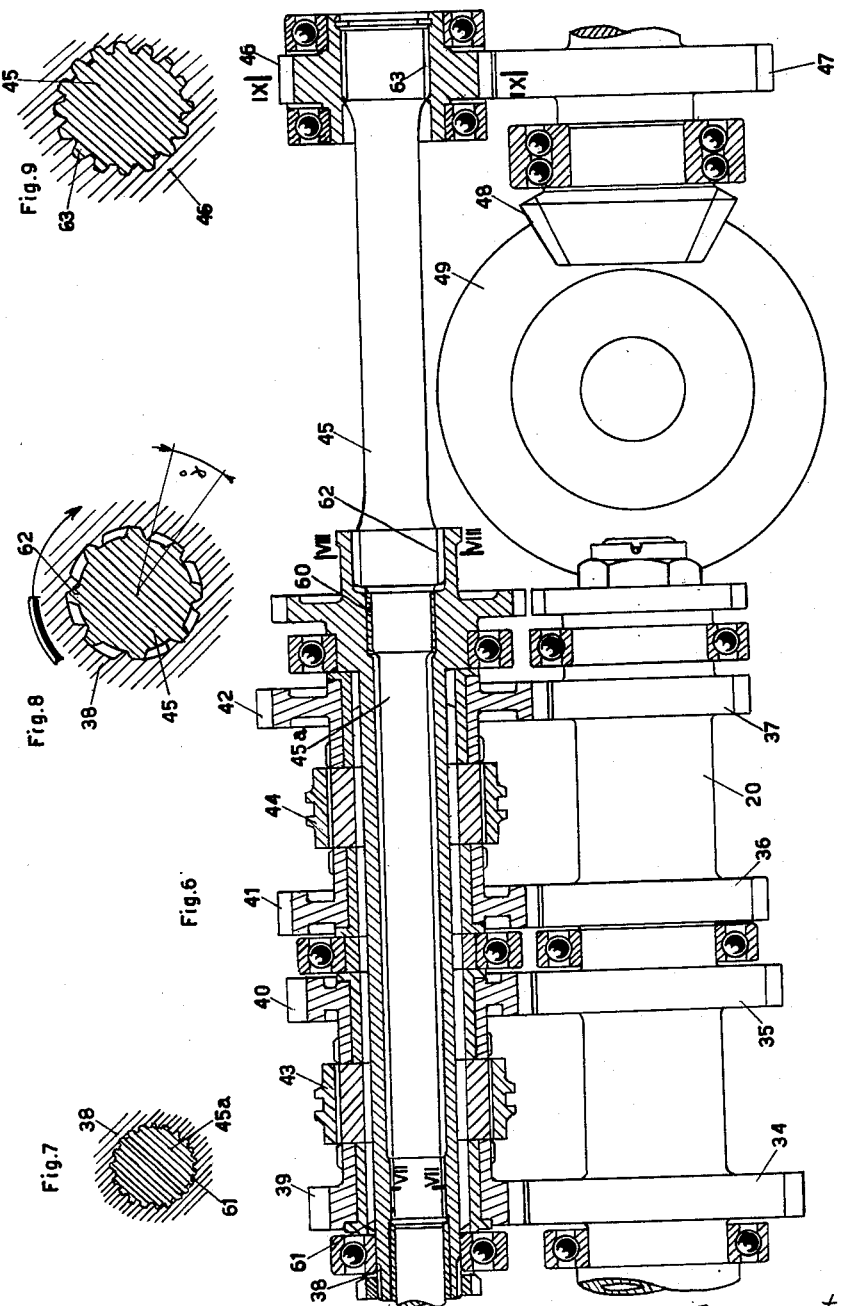

Patented Apr. 14, 1953

2,634,710

UNITED STATES PATENT OFFICE 2,634,710

PROPELLING UNIT FOR MOTOR VEHICLES

Dante Giacosa, Turin, Italy, assignor to Fiat Societa per Azioni, Turin, Italy

Application August 25, 1950, Serial No. 181,351
In Italy September 2, 1949

5 Claims. (Cl. 121—120)

1

This invention relates to a propelling unit for motor vehicles, comprising an internal combustion engine, a friction clutch, a change speed gear and a differential gear.

An object of the invention is to provide a propelling unit of the type referred to above, in which the various members of the unit are combined together to form a compact self-contained unit not appreciably exceeding in size a conventional internal combustion engine with two cylinder rows, which may be fitted without any difficulty either to the front or rear axle of a motor vehicle.

A further object of this invention is to provide a propelling unit, in which the internal combustion engine is of the type comprising two rows of vertical cylinders, a seat being formed in the clearance between the two cylinder rows for accommodating the change speed gear, which is therefore fully enclosed in the crank case.

A further object of this invention is to provide a propelling unit for motor vehicles of the type referred to above, in which the driving shaft of the change speed gear receives movement from the engine through a friction clutch seated in a box-shaped cover enclosing the front of the crankcase. The driven shaft of the change speed gear transmits through a gear to the differential mechanism which is arranged in a box-shaped cover closing the rear end of a crankcase. With this arrangement, all the members of the unit are fully enclosed in the engine body and are at the same time easily accessible for cleaning purposes and for replacement of parts. Moreover, the propelling unit arranged as above affords the advantage of having its centre of gravity displaced to the axis of the transverse transmission system, that is to the driving axle. This imparts in a rear engine car, a centre of gravity of the motor unit lying between the vehicle axles, and displaced to the rear axle as far to the front of the vehicle as possible, consistently with the space occupied by the engine, which is minimized.

A further object of this invention is to provide a propelling unit as specified above, in which the differential gear is arranged between the change speed gear and driving pinion, so that movement is transmitted by said change speed gear to said pinion by means of a torsionally resilient shaft extending through the box-cover enclosing the toothed rim of the differential gear.

A further object of this invention is to provide in the above described propelling unit a torsionally resilient shaft made up of two sections differing in diameter, the smaller diameter section being mounted coaxially in the hollow driven shaft of the change speed gear and being coupled by means of a dog clutch with said hollow shaft at one end and with a lost motion splined coupling at its other end. With this arrangement, movement is normally transmitted by the hollow driven shaft through the dog clutch to the larger diameter section. In the case of breakage or an excessive torque of the smaller diameter section, the lost motion coupling comes into action, thereby affording a constant transmission of movement to the differential gear.

The invention will be more clearly understood from the following description and claims, reference being had to the accompanying drawings, wherein:

Figure 6 is a longitudinal section showing the details of the change speed gear, and Figures 7, 8 and 9 are part cross sections on an enlarged scale on lines VII—VII, VIII—VIII and IX—IX of Figure 6.

Figure 1:
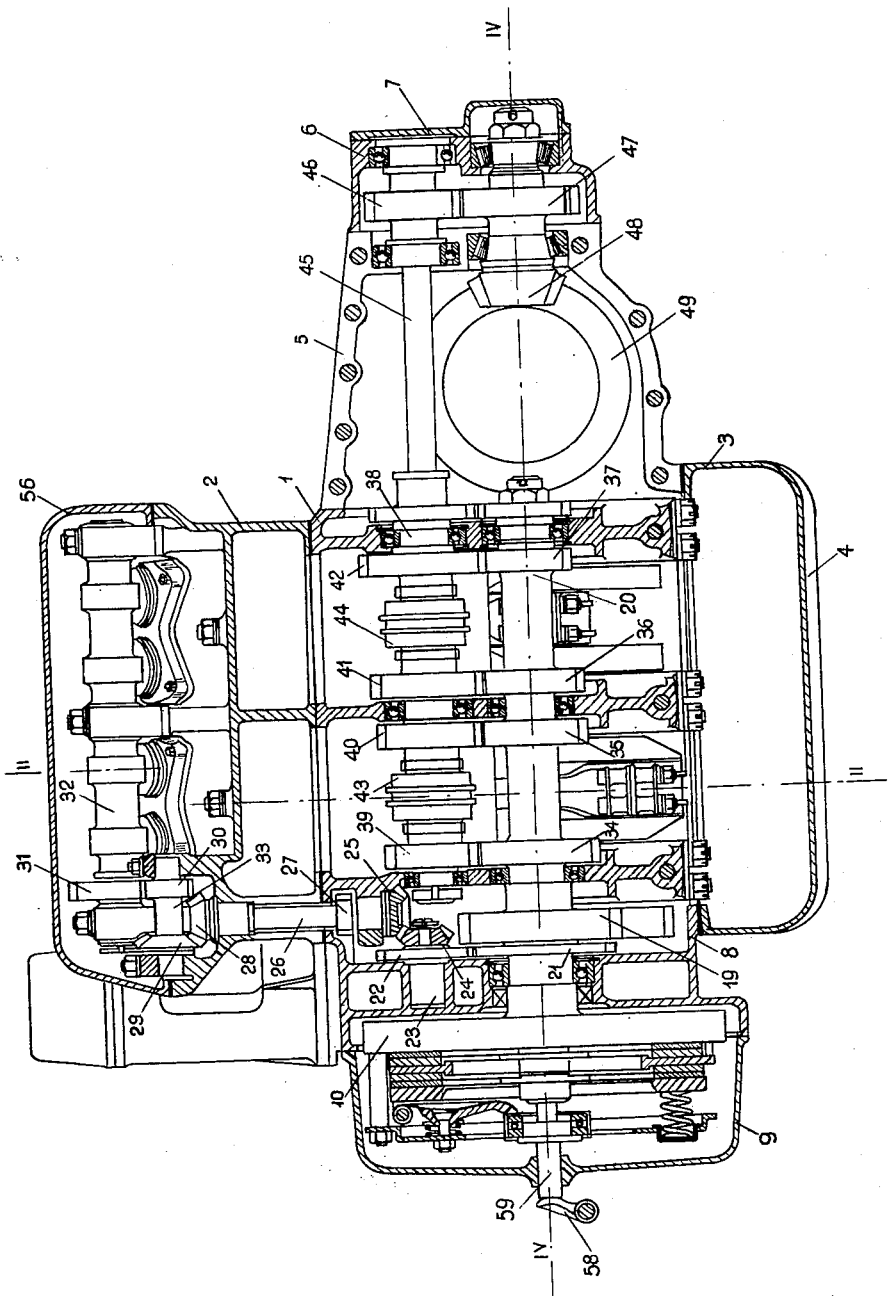
Figure 1 is a longitudinal section of the propelling unit on line I—I of Figure 2.

1 denotes the crankcase common to both cylinder rows, to which is attached the head 2 enclosing the valve gear and closed by a top cover 56.

3 denotes the oil sump of the engine provided with longitudinal cooling ribs 4. 5 denotes the differential gear casing closed at the rear by the casing 6 supporting the bearings of the drive gears and by a sealing cover 7. A casing 8 is secured to the front of the crankcase and encloses the clutch 10 and members of the drive gear which will be described hereinafter. The casing 8 is closed by a front cover 9. The lower wall of the casing 8 has fixed thereto the water circulating pump 13 (Fig. 5) and a casing 14 enclosing two oil pumps, connected to the engine lubricating circuit and oil cooling circuit, respectively. 11 and 12 are the casings for the two ignition magnetos for the engine.

Figure 4:
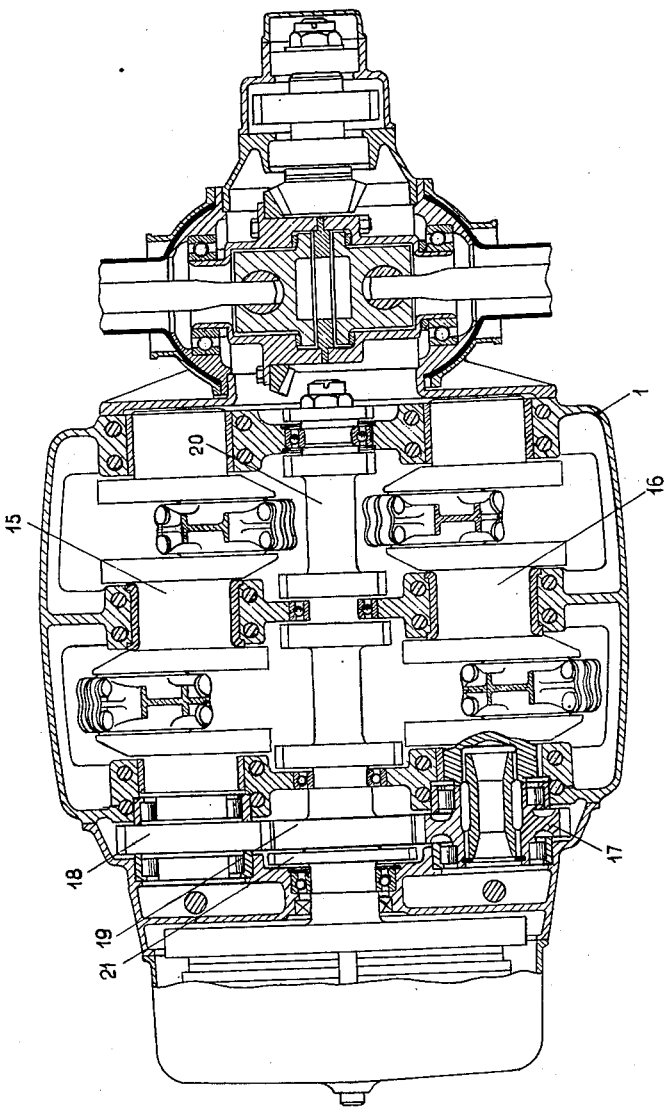
Figure 4 is a horizontal section of the unit on line IV—IV of Fig. 1.

15, 16 (Figure 4) denote the two crankshafts, each associated with a row of engine cylinders and provided at their front end with two transmission gears 17, 18 transmitting rotation to the gear 19 loosely mounted on the primary shaft 20 of the change speed gear supported by the crankcase 1 in the space between the two rows of cylinders.

The toothed wheel 19 having its axis situated in the plane of symmetry of the engine, is rigidly connected with the driving member of the friction clutch 10, of which the driven member is slidably mounted but held against rotation on the shaft 20 of the change speed gear. Normally the friction clutch is held closed by springs 10' so that movement is transmitted by the toothed wheel 19 to the change speed gear. In order to disconnect the change speed gear from the engine, a lever 48 is provided which disconnects the clutch through the rod 59.

A gear 21 fixedly connected with the gear 19 meshes with the toothed wheel 22 mounted on a pivot 23 fixedly connected with a bevel gear 24.

The wheel 24 meshes with another bevel gear 25 mounted on the lower end of a vertical shaft 26 transmitting motion through a bevel gearing 28, 29 to a horizontal shaft 33 which drives, through a spur gearing 30, 31, the valve gear shaft 32 arranged in the header 2 of the left-hand cylinder row.

Figure 2:
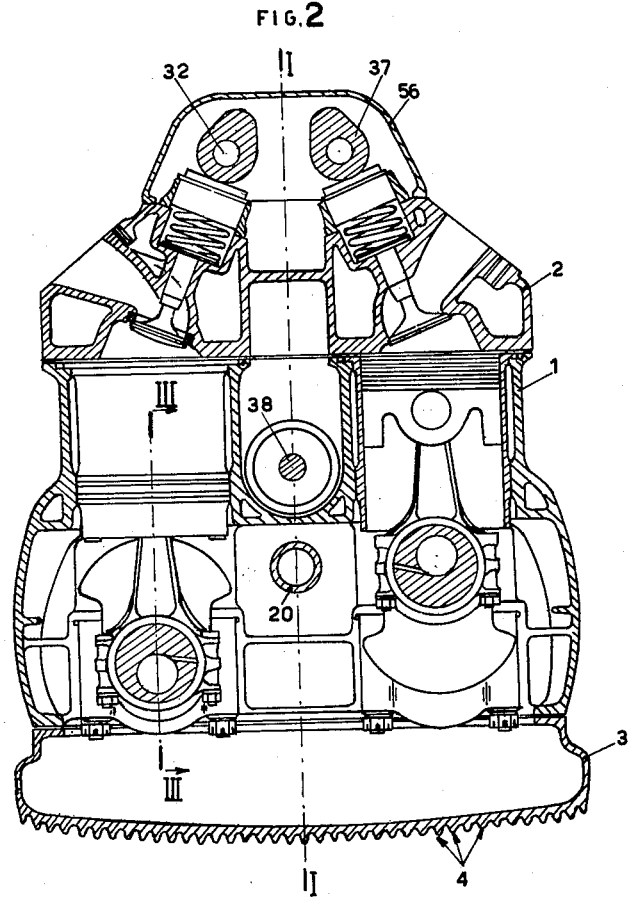
Figure 2 is a cross section of the unit.
Figure 3:
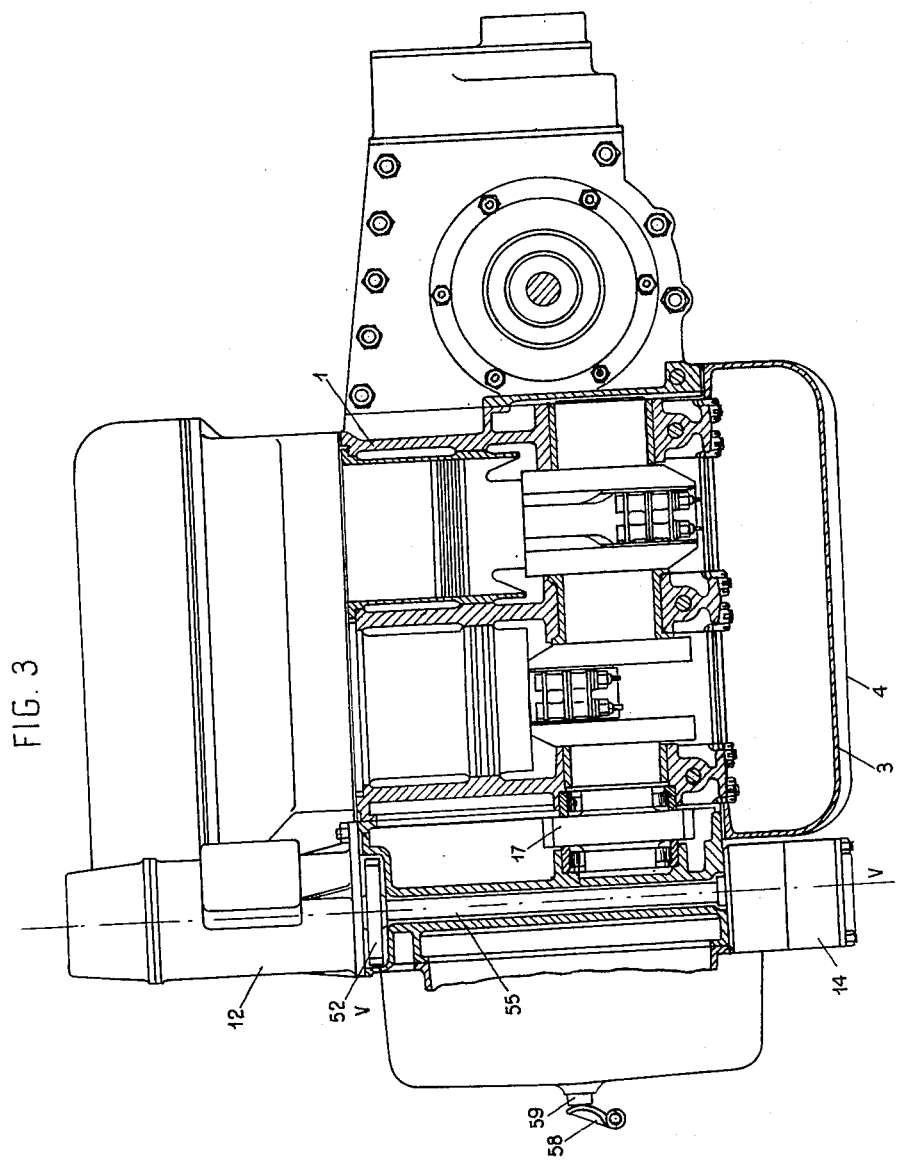
Figure 3 is a side view of the unit in a part longitudinal section on line III—III of Figure 2.

The spur gearing 30 further meshes with a toothed wheel keyed to the camshaft 37 for the other cylinder row (Fig. 2).

Figure 5:
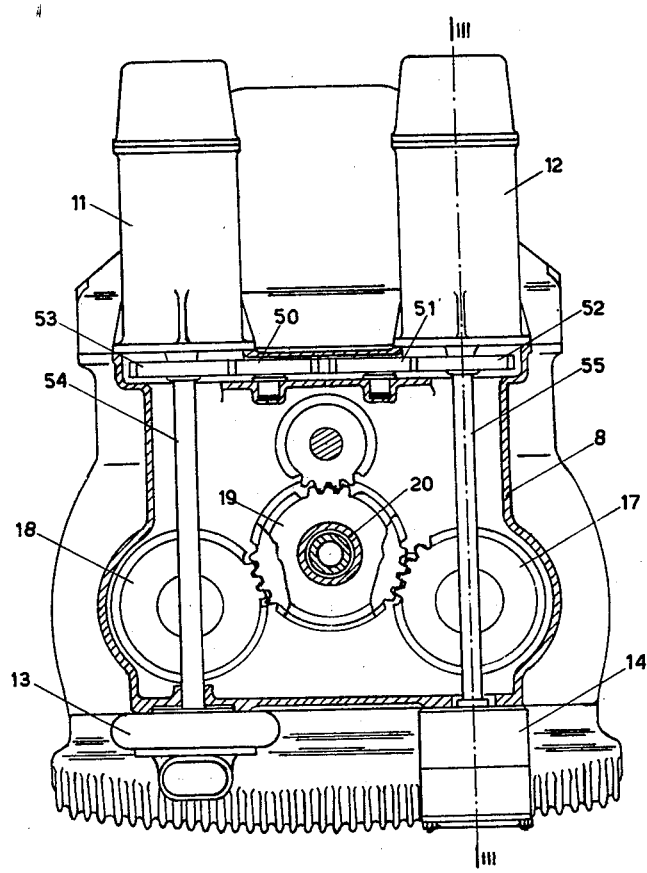
Figure 5 is a front view of the unit in part sectional view on line V—V of Figure 3.

A toothed wheel 27 is keyed to the vertical shaft 26 and transmits motion through the gears 50, 53 to the vertical shaft 54 driving the water pump 13 and magneto 11 and, through the gears 51, 52 to the vertical shaft 55 driving the oil pumps in the casing 14 and the magneto 12 (Fig. 5).

Gears 34, 35, 36, 37 are keyed to the shaft 20 and mesh with the gears 39, 40, 41, 42 loosely mounted on the tubular driven shaft 38 of the change speed gear supported by the crankcase 1 above the shaft 20.

Two clutches 43, 44 are slidably splined between gears 39, 40 and gears 41, 42, respectively and transmit motion from the shaft 20 to the driven shaft 38 through one of the four pairs of gears in mesh. The clutches 43 and 44 are hand-operated for throwing in the desired gear by means of the usual lever of the change speed gear, which is not shown on the drawing for the sake of simplicity. 45 denotes a torsionally resilient shaft connecting the change speed gear with the differential gear driving unit comprising two gears 46, 47 and a bevel gear 48 meshing with the differential toothed rim 49.

The gears 46, 47 form a transmission gear situated on the remote side of the engine with respect to the transverse transmission unit (driving axle), the said transmission gear being easy to replace without disassembling any members of the transverse transmission unit, for the purpose of rapidly changing the transmission ratio.

The shaft 45 interposed between the change speed gear and differential gear is made up of two sections differing in diameter. The section 45a of reduced diameter is supported internally of the driven shaft 38 of the change speed gear by a bushing 60 (Fig. 6) and is keyed in front to the shaft 38 as shown at 61.

The section larger in diameter is keyed at one end at 63 within the gear 46 and at its other end to the shaft 38 of the change speed gear by means of a splined coupling 62 so constructed to permit a limited relative angular movement of a width $a°$, Fig. 8 between shafts 38 and 45.

Movement is normally transmitted from the shaft 38 through the splined coupling 61 to the shaft 45; in the case of breakage or of an excessive torque on the section 45a, reduced in diameter, the splined coupling 62 comes into action and insures a steady transmission of movement to the differential gear.

What I claim is:

1. Propelling unit for motor vehicles comprising a crankcase, two parallel rows of vertical motor cylinders mounted in said crankcase, a change speed gear arranged in said crankcase between said cylinder rows, a box-shaped cover secured to the front end of said crankcase, a friction clutch mounted in said cover for transmitting movement from said motor cylinders to said change speed gear, a second box-shaped cover fitted to the rear end of said crankcase and a differential gear mounted in said second box-shaped cover and operatively connected with said change speed gear.

2. Propelling unit for motor vehicles comprising a crankcase, two parallel rows of vertical motor cylinders mounted in said crankcase, a change speed gear arranged in said crankcase between said cylinder rows and having a primary shaft and a secondary shaft, a toothed wheel receiving motion from said two rows of motor cylinders, loosely mounted on said primary shaft, a box-shaped cover secured to the front end of said crankcase, a friction clutch mounted in said cover for connecting said toothed wheel with said primary shaft, a second cover of box shape fitted to the rear end of said crankcase, a differential mechanism mounted in said second cover and a torsionally resilient shaft for connecting said secondary shaft with said differential mechanism.

3. Propelling unit for motor vehicles comprising a crankcase, two parallel rows of vertical motor cylinders mounted in said crankcase, a change speed gear arranged in said crankcase between said cylinder rows, and having a primary shaft and a secondary shaft, a toothed wheel receiving motion from said two rows of motor cylinders, loosely mounted on said primary shaft, a box-shaped cover secured to the front end of said crankcase, a friction clutch mounted in said cover for connecting said toothed wheel with said primary shaft, a second cover of box shape fitted to the rear end of said crankcase, a differential mechanism mounted in said second cover, and a torsionally resilient shaft comprising two sections differing in diameter having different flexibility properties for connecting said secondary shaft with said differential mechanism.

4. Propelling unit for motor vehicles, comprising a crankcase, two parallel rows of vertical motor cylinders mounted in said crankcase, a change speed gear mounted in said crankcase between said cylinder rows and having a primary shaft and a hollow secondary shaft, a toothed wheel receiving motion from said two rows of motor cylinders, loosely mounted on said primary shaft, a box-shaped cover secured to the front end of said crankcase, a friction clutch mounted in said cover for connecting said toothed wheel with said primary shaft, a second cover of box shape fitted to the rear end of said crankcase, a differential mechanism mounted in said second cover of box shape and a torsionally resilient shaft for connecting said hollow secondary shaft with said differential mechanism, said torsionally resilient shaft comprising two sections differing in diameter, the smaller diameter section being coaxially mounted in said hollow secondary shaft, a splined coupling between the free end of said smaller diameter section and the hollow secondary shaft and a lost motion splined coupling between the other end of said smaller diameter section and said secondary shaft.

5. Propelling unit for motor vehicles as claimed in claim 4, in which the torsionally resilient shaft is operatively connected with a pair of toothed wheels for transmitting movement to said differential mechanism, said pair of toothed wheels being situated on the remote side of the engine with respect to the transverse axis of said differential mechanism.

DANTE GIACOSA.

References Cited in the file of this patent

UNITED STATES PATENTS

| Number | Name | Date |
|---|---|---|
| 942,406 | Norton | Dec. 7, 1909 |
| 948,248 | Reaugh | Feb. 1, 1910 |
| 960,573 | McKiearnan | June 7, 1910 |
| 2,018,794 | Kremser | Oct. 29, 1935 |